United States Patent [19]

Ruppel et al.

[11] Patent Number: 5,443,889
[45] Date of Patent: Aug. 22, 1995

[54] MARKED MULTI-PLY PAPER SHEETS AND METHOD AND EQUIPMENT FOR THEIR MANUFACTURE

[75] Inventors: Remy Ruppel, Durrenentzen; Pierre Laurent, Colmar; Joel Hungler, Urschenheim, all of France

[73] Assignee: Kaysersberg, France

[21] Appl. No.: 107,708

[22] Filed: Oct. 20, 1993

[30] Foreign Application Priority Data

Feb. 20, 1991 [FR] France ............... 91 02003

[51] Int. Cl.6 .................. B32B 3/00; B31F 1/20; D21H 11/00
[52] U.S. Cl. .................. 428/172; 428/152; 428/154; 428/166; 428/178; 428/198; 428/535; 156/209; 156/290; 162/109; 162/113; 162/117
[58] Field of Search ............... 428/172, 178, 188, 154, 428/152, 166, 194, 212, 198, 535, 537.5; 156/204, 209, 210, 290; 162/113, 117, 2.5, 109

[56] References Cited

U.S. PATENT DOCUMENTS 4,320,162  3/1982  Schulz ................... 428/154
4,978,565 12/1990  Pigneul ................. 428/156

Primary Examiner—Donald J. Loney
Attorney, Agent, or Firm—Breiner & Breiner

[57] ABSTRACT

A paper sheet having several distinct layers comprised of at least two plies of paper glued together in discrete areas and characterized by having patterns which correspond to areas of reduced thickness on both outer surfaces of the plies of paper.

13 Claims, 1 Drawing Sheet

MARKED MULTI-PLY PAPER SHEETS AND METHOD AND EQUIPMENT FOR THEIR MANUFACTURE

FIELD OF INVENTION

The present invention concerns novel, marked, multi-ply paper sheets and, further, a method and apparatus for their manufacture.

More specifically, the invention relates to crepe multi-ply paper sheets of the absorbent cotton type for household and sanitary uses.

BACKGROUND OF INVENTION

In the paper field and, in particular, papers for household and sanitary use, many multi-ply products are known wherein several previously embossed paper plies are joined to form a laminate. As to this kind of product, the attempt is made to combine softness, in order to create a pleasant touch, and absorption with good properties of mechanical strength. As a rule, these products are made by joining and bonding the previously embossed paper plies to one another at discrete points.

In that procedure, a glue-depositing device deposits glue on a first and previously embossed ply at the tip of a projection made during embossing. Then, this first ply is made to touch another ply also previously embossed, so as to achieve bonding between the two plies at their contact points.

Depending on the relative positions of the embossings at the time the plies are being bonded, such techniques basically allow for two kinds of assembly. For example, U.S. Pat. No. 3,414,459 describes an assembly whereby the embossing tips are mutually opposite, whereas U.S. Pat. No. 3,867,225 describes an assembly whereby the embossing tips of one ply will nest between the embossing tips of the other ply.

Since embossing has been used, the manufacturing method for such products restrict the diversity of patterns that can be imprinted into the paper because such systems can only use engravings of rounded patterns or patterns lacking sharp angles in order to restrict the losses in mechanical strength during the embossing. What is of concern is to avert breaking the fibers of the plies.

Moreover, it is desirable to minimize the amount of glue used, especially to avoid rigidity.

Accordingly, it has previously been suggested to mark and assemble two plies without using glue. Illustratively, such products are described in U.S. Pat. No. 4,281,243. Therein two bonded plies are linked solely at their edges. This feature does not allow for the fact that it would be impossible to preserve the plies' mechanical strength over their entire surface from the applied and required high pressures, for instance by knurling, to achieve adequate linkage.

U.S. Pat. No. 3,672,549 suggests a procedure for bonding two previously embossed plies at discrete points. As shown by FIG. 2 of the patent showing apparatus with which to carry out the procedure, it is noted that in order to achieve the discrete bonding of the two plies, the apparatus employs three cylinders 27, 28 and 30. Two of these cylinders, i.e., 27 and 30, are rubber-coated and have engraved surfaces. The third, i.e., 28, however, is made of smooth steel. The cylinder 27 cooperates with a glue-depositing device and carries out simultaneously glue deposition and marking of ply 10.

The two plies 9 and 10 are bonded when they pass between the cylinders 28 and 30. In particular, because the system makes use of the smooth cylinder 28, the system runs the risk of the ply slipping relative to the cylinder surface. Such slippage can result in irregular final patterns or in breaks in the paper.

The system incurs another drawback in that the glue is deposited on an engraved surface and then is transferred to the paper. In order to prevent the glue on the rubber surface from drying and from soiling the rubber surface, a large amount of glue is required. Therefore, it is impossible to make multi-ply and low-weight products in which the amount of dragged-away glue would have been much reduced.

Another drawback incurred by this ply marking and bonding system arises from the relative positions of the cylinders 27, 28 and 30. The final product is never symmetrically marked on the two outer sides of the laminate formed from the plies 9 and 10 since one of the two markings is located inside the formed laminate at the time the two plies are bonded together.

OBJECTS AND BRIEF DESCRIPTION OF INVENTION

Now applicant has discovered a novel method allowing for infinitely varying the shape of the patterns that can be marked on the sheets, in particular, by allowing the use of sharp-angled patterns without danger of losing mechanical strength while yet allowing optimization of the amount of glue deposited. This strikes a good trade-off between providing adequate bonding of the two plies and minimal stiffness.

The expression "marking" herein denotes embossing-free printing of patterns which can be complex designs, for example of lotus flowers or sets of discontinuous lines, for instance representing waves. Such markings cause no projections at all or any other protruding deformation relative to the initial plane of the sheet.

Accordingly, a first object of the invention is to create multi-ply paper sheets, in particular of crepe paper of the absorbent cotton type, which are bonded to each other in discrete zones and have markings on their external sides.

A second object of the invention is to provide a method allowing for the simultaneous and simple marking of arbitrary patterns, in particular evincing sharp angles, and the bonding of the plies to form a multi-ply paper.

Lastly, another object of the invention is to provide apparatus to carry out the method of the invention.

According to a main feature of the invention, a multi-ply paper sheet composed of at least two plies mutually bonded in discrete zones is characterized in that the multi-ply sheet has patterns corresponding to zones of lesser-thickness on the two outer plies of the multi-ply sheet.

In a preferred feature of the invention, the plies are made of absorbent-cotton crepe paper.

In another feature of the invention, the bonding zones are located in the vicinity of the patterns on one of the plies.

In another feature, the patterns of the two sides can be identical or different.

In yet another feature, the invention provides a method and apparatus to manufacture the multi-ply papers of the present invention.

Further objects and advantages of the present invention are elucidated in the description below and in relation to the drawings.

DESCRIPTION OF PRESENTLY PREFERRED EMBODIMENTS

Figure 1:
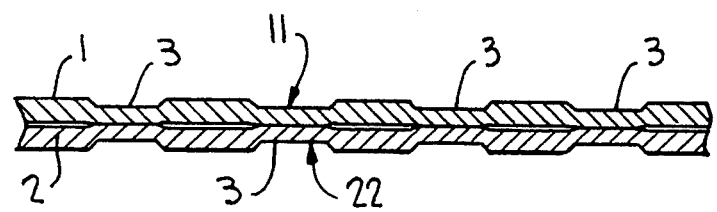
FIG. 1 is a cross-section of a two-ply paper sheet of the present invention.

FIG. 1 shows a sheet formed from two paper plies 1 and 2 bonded to each other in discrete zones 3. Each ply is of a given thickness which is decreased where they evince markings 11, 22. The glue-deposit zones 3 are congruent with the patterns 11 on ply 1. The effective bonding zones can be narrower than the glue-deposit zones if the pattern of the ply 2 is thinner than that of the ply 1.

Figure 2:
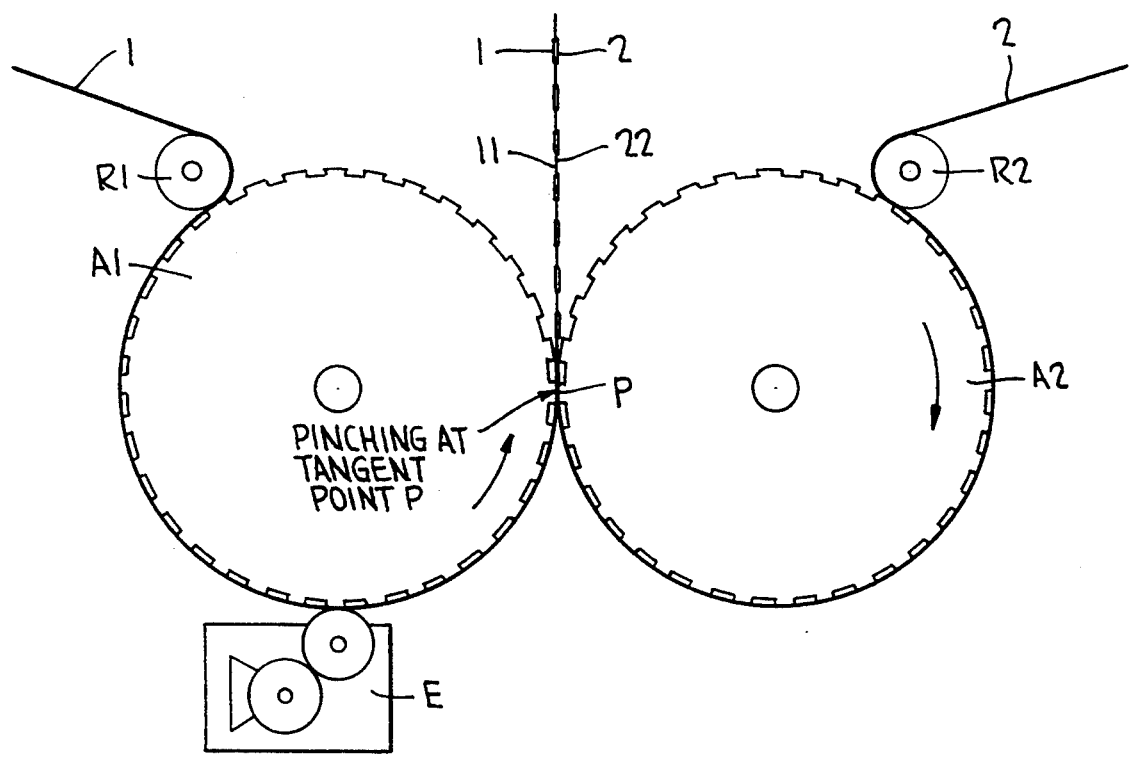
FIG. 2 shows apparatus with which to implement the invention.

FIG. 2 shows apparatus with which to manufacture the two-ply sheets of the invention. This apparatus consists of two undeforming and, illustratively, steel cylinders denoted as A1 and A2, the surfaces of which bear engraved patterns which can be complex.

These two cylinders are set into relative rotation in the directions indicated by the arrows and rotate synchronously whereby the raised zones are congruent in the pressing zone.

In the method of the invention, the first ply 1 is fed from a supply roll R1 touching the cylinder A1. Without deforming, the ply will hug the surface of the cylinder A1. Glue is deposited on the areas on the ends of the projections when the ply passes between the cylinder A1 and a conventional glue-depositing device E. The glue-depositing device can consist of a first cylinder immersed in a tub containing glue and a second cylinder on which the glue is deposited by the first cylinder. The second cylinder is in contact with the ply 1 and deposits the glue onto the projection ends.

A second ply 2 is made to come into contact with the surface of the cylinder A2 by means of a feed roll R2.

When the two cylinders A1 and A2 are rotating, the two plies, with glue locally deposited on the first ply, touch each other near the point A where, on account of the compression by the two cylinders, simultaneously marks the desired pattern and bonds the two plies.

The method of the present invention allows the marking of various designs onto the paper. This feature is impossible with the procedures which require actually embossing the paper whereby the designs of the patterns are imprinted into the paper. This limited the designs to simple ones, especially those lacking sharp angles.

Moreover, the compression of the two cylinders near the point A is comparatively slight and does not raise the risk of tearing the plies. When idle, the cylinders do not touch or only touch slightly. It suffices that the two cylinders be apart slightly less than the thickness of the two plies to achieve simultaneous marking of and bonding of the two plies. For example, the cylinders can be apart between 0.001 and 0.1 mm, for instance 0.03 mm for a paper thickness of 0.1 to 0.15 mm.

The sole restriction affecting the patterns of the present invention concerns their height and the distance between the cylinder projections which must allow proper glue-deposition on the sheet in the vicinity of the projections without depositing glue on the ply segments between the projections. Moreover, it has been found that the glue advantageously acts like a lubricant in the method of the present invention. Excess glue holding areas relative to the actually bonded surface is not necessarily a drawback.

To avoid unduly large glue deposition, the glue-depositing device advantageously is located fairly close to point A and, preferably, the contact between the cylinder A1 and the glue-depositing device is on the cylinder A1 less than a quarter-circle away from the point A.

In particular, applicant shows that to achieve optimal properties of flexibility in the presence of good bonding between the two plies, the engravings of the cylinders A1 and A2 must be such that it is possible to inscribe a circle of 1 cm in diameter between two consecutive patterns on a ply marked in the manner of the invention. Another feature of the invention consists in the possibility of inscribing at least twenty circles of 1 cm in diameter between the patterns into a square of 1 dm$^2$. Another advantageous feature is that the distance between two mutually bonded zones shall be less than 6 cm.

As already stated above, the two cylinders can have symmetrical engravings or different engravings.

Moreover, plies 1 and 2 can be double or triple plies.

We claim:

1. A multi-ply sheet with two external surfaces comprising (a) at least a first ply and a second ply, each of said first ply and said second ply having an unembossed inner surface and wherein the unembossed inner surface of said first ply faces toward the unembossed inner surface of said second ply; and (b) an adhesive bonding the inner surface of said first ply to the inner surface of said second ply in discrete zones which provide areas of decreased thickness on the two external surfaces of said multi-ply sheet such that the multi-ply sheet evinces patterns corresponding to said discrete zones.

2. A multi-ply sheet according to claim 1 wherein said first ply and said second ply are paper.

3. A multi-ply sheet according to claim 2 wherein said paper is crepe paper.

4. A multi-ply sheet according to claim 1 wherein said discrete zones are located level to the patterns.

5. A multi-ply sheet according to claim 1 wherein said patterns correspond to pinch zones in said first ply and said second ply.

6. A multi-ply sheet according to claim 1 wherein said patterns in said first ply and said second ply are identical.

7. A multi-ply sheet according to claim 1 wherein said patterns in said first ply and said second ply are different.

8. A multi-ply sheet according to claim 1 wherein a circle 1 cm in diameter can be inscribed between two adjoining patterns.

9. A multi-ply sheet according to claim 1 wherein at least 20 circles, each being 1 cm in diameter, can be inscribed between patterns in a ply of 1 dm$^2$.

10. A multi-ply sheet according to claim 1 wherein said discrete zones are separated from each other by less than 6 cm.

11. A method of manufacturing a multi-ply sheet with two external surfaces comprising (a) at least a first ply and a second ply, each of said first ply and said second ply-having an unembossed inner surface and wherein the unembossed inner surface of said first ply faces toward the unembossed inner surface of said second ply; and (b) an adhesive bonding the inner surfaces together in discrete zones which provide areas of decreased thickness on the two external surfaces of said multi-ply sheet such that the multi-ply sheet evinces patterns corresponding to said discrete zones, comprising moving said first ply onto a first undeforming cylinder bearing engraved patterns, depositing an adhesive onto said first ply in a vicinity of said patterns, passing said second ply onto a second undeforming cylinder bearing engraved patterns, and causing said first ply to touch said second ply while said first ply is on said first cylinder and said second ply is on said second cylinder so that said first ply and said second ply bond together and the patterns imprint on said first ply and said second ply by pressure from said first cylinder and said second cylinder, wherein said first cylinder and said second cylinder are spaced so as to allow imprinting of the patterns.

12. A method according to claim 11 wherein said first cylinder and said second cylinder are spaced apart in an amount less than the thickness of said multi-ply sheet.

13. A method according to claim 12 wherein said first cylinder and said second cylinder are each a steel cylinder containing engraved patterns.

* * * * *